United States Patent
Delmas et al.

(10) Patent No.: US 6,267,936 B1
(45) Date of Patent: Jul. 31, 2001

(54) METHOD FOR EFFECTING SOLVENT EXTRACTION OF METAL IONS USING HYDROCARBON SOLUBLE AMINOMETHYLENE PHOSPHONIC ACID COMPOUNDS

(75) Inventors: Francisco Delmas, Portela LRS; Carlos Nogueira, Queluz, both of (PT); Michael Ehle; Knut Oppenländer, both of Ludwigshafen (DE)

(73) Assignees: BASF Aktiengesellschaft, Ludwigshafen (DE); Instituto National de Engenharia e Tecnologia, Lisboa (PT)

( * ) Notice: Subject to any disclaimer, the term of this patent is extended or adjusted under 35 U.S.C. 154(b) by 0 days.

(21) Appl. No.: 09/269,183

(22) PCT Filed: Sep. 15, 1997

(86) PCT No.: PCT/EP97/05042

§ 371 Date: Mar. 29, 1999

§ 102(e) Date: Mar. 29, 1999

(87) PCT Pub. No.: WO98/14621

PCT Pub. Date: Apr. 9, 1998

(30) Foreign Application Priority Data

Sep. 30, 1996 (EP) .................................. 96115628

(51) Int. Cl.$^7$ ............................ C22B 47/00; C22B 23/00; C22B 25/00; C22B 30/00; C22B 21/00

(52) U.S. Cl. ................. 423/49; 423/54; 423/63; 423/87; 423/89; 423/99; 423/112; 423/139; 423/157; 210/634

(58) Field of Search ...................... 210/638, 902, 210/912, 913, 914, 634; 423/157, 63, 54, 49, 139, 24, 99, 112, 89, 87

(56) References Cited

U.S. PATENT DOCUMENTS

| | | | |
|---|---|---|---|
| 3,288,846 | * 11/1966 | Irani et al. | |
| 4,741,831 | * 5/1988 | Grinstead | 210/683 |
| 4,758,414 | * 7/1988 | Gifford et al. | 423/122 |
| 5,795,482 | * 8/1998 | Ehle et al. | 423/139 |

FOREIGN PATENT DOCUMENTS

96/00309 * 1/1996 (WO).

* cited by examiner

*Primary Examiner*—Steven Bos
(74) *Attorney, Agent, or Firm*—Oblon, Spivak, McClelland, Maier & Neustadt, P.C.

(57) ABSTRACT

Solvent extraction of one or more metal ions from an aqueous solution in the presence of hydrocarbon-soluble aminomethylenephosphonic acid derivatives.

14 Claims, No Drawings

METHOD FOR EFFECTING SOLVENT EXTRACTION OF METAL IONS USING HYDROCARBON SOLUBLE AMINOMETHYLENE PHOSPHONIC ACID COMPOUNDS

FIELD OF THE INVENTION

The present invention relates to the use of hydrocarbon-soluble aminomethylenephosphonic acid derivatives comprising the structural element of the formula I

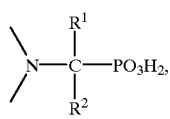
(I)

where $R^1$ and $R^2$ are hydrogen, $C_1$–$C_{30}$-alkyl which can additionally bear up to 15 hydroxyl groups and/or be interrupted by up to 14 non-adjacent oxygen atoms, $C_2$–$C_{30}$-alkenyl, $C_7$–$C_{18}$-aralkyl or $C_6$–$C_{14}$-aryl which can be substituted by up to three $C_1$–$C_{12}$-alkyl groups, $C_1$–$C_{12}$-alkoxy groups, halogen atoms, cyano groups, hydroxyl groups or $C_1$–$C_4$-alkoxycarbonyl groups, for the solvent extraction of one or more metal ions from the group consisting of lithium, sodium, potassium, rubidium, cesium, francium, beryllium, magnesium, calcium, strontium, barium, radium, scandium, yttrium, lanthanum, cerium, praseodymium, neodymium, promethium, samarium, europium, gadolinium, terbium, dysprosium, holmium, erbium, thulium, ytterbium, lutetium, actinium, thorium, protactinium, neptunium, plutonium, americium, curium, berkelium, californium, einsteinium, fermium, mendelevium, nobelium, lawrencium, titanium, zirconium, hafnium, vanadium, niobium, tantalum, chromium, molybdenum, tungsten, manganese, technetium, rhenium, ruthenium, osmium, cobalt, rhodium, iridium, nickel, platinum, copper, silver, gold, zinc, cadmium, mercury, aluminum, gallium, thallium, germanium, tin, lead, arsenic and polonium from aqueous solutions.

The invention also relates to the use of these hydrocarbon-soluble aminomethylenephosphonic acid derivatives for selectively separating one or more of the above metal ions from one another by solvent extraction.

DESCRIPTION OF THE BACKGROUND

The removal of undesired accompanying metals from aqueous solutions and the separation of metals is particularly important in hydrometallurgical nonferrous metal production, eg. in the winning of copper, zinc, noble metals or other special metals. Solutions of desired metals are frequently obtained from ores by digestion or leaching with aqueous, usually acid systems. The interfering or accompanying metals have to be removed from these solutions and separated from one another. In addition, the work-up of metal-containing wastes or residues (eg. flue dusts or precipitation sludges from wastewater treatment) and the recycling of used metal products (eg. catalysts) nowadays play an ever more important role in the provision of aqueous solutions of desired metals. Regardless of the origin of the metal salt solutions, it is always necessary to remove interfering elements from these solutions of desired metals and to separate the metals into individual fractions so that pure metals can be isolated. Apart from improving the quality of the desired metals, recovery of metals and reducing contamination of landfill areas is sought in the waste and residue processing sector for economic and ecological reasons.

The solvent extraction of iron ions is known in the literature. Thus, DE-A 38 01 430 (1) describes the use of a mixture comprising a primary amine and an alkylphosphonic monoester such as mono-2-ethylhexyl 2-ethylhexylphosphonate for the removal of iron(III) ions from acid zinc salt solutions by solvent extraction.

Furthermore, JP-A 1985/077936 (2) discloses that aminomethylenephosphonic acid derivatives are suitable for the solvent extraction of uranium, antimony or bismuth and of indium.

U.S. Pat. No. 4,741,831 (3) relates to a process for separating metals such as iron, cobalt, copper, vanadium, cadmium, nickel, zinc, lead or aluminum from aqueous solutions using water-soluble polymeric complexing agents, for example polyethyleneiminephosphonates. The metal complex is subsequently separated off by dialysis or ultrafiltration by means of membranes.

WO-A 96/00309 (4) describes the solvent extraction of iron ions from aqueous solutions, particularly from solutions of zinc or copper, by means of the present hydrocarbon-soluble aminomethylenephosphonic acid derivatives.

In the reference Proc. Symp. Solvent Extr. (1995) 59–60 (5), Y. Baba, Y. Kawano and J. Shibata describe the separation of palladium from chloride solutions by means of di (2-ethylhexyl) aminomethylenephosphonic acid.

However, the above processes of the prior art still have disadvantages. They are mostly not efficient enough and are too uneconomical. In particular, the selectivity of the separation of the interfering metals from the desired metals and the loading capacity of the complexing agents used are still in need of improvement.

SUMMARY OF THE INVENTION

It is an object of the present invention to find an improved system for the solvent extraction of metal ions from aqueous solutions which no longer has the disadvantages of the prior art.

We have found that this object is achieved by the use as defined in the introduction of the hydrocarbon-soluble aminomethylenephosphonic acid derivatives having the structural element I.

Preferably, use is made of hydrocarbon-soluble aminomethylenephosphonic acid derivatives comprising the structural element of the formula Ia

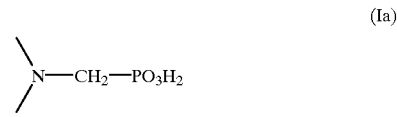
(Ia)

For the purpose described, particular preference is given to hydrocarbon-soluble aminomethylenephosphonic acid derivatives of the general formula II

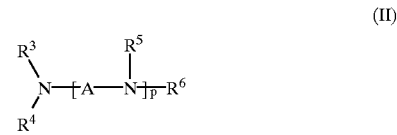
(II)

where
$R^3$ to $R^6$ are each hydrogen, $C_1$–$C_{30}$-alkyl which can additionally bear up to 15 hydroxyl groups and/or be interrupted by up to 14 non-adjacent oxygen atoms, $C_2$–$C_{30}$- alkenyl, $C_7$–$C_{18}$-aralkyl, $C_6$–$C_{14}$-aryl which can be substituted by up to three $C_1$–$C_{12}$-alkyl groups, $C_1$–$C_{12}$-alkoxy groups, halogen atoms, cyano groups, hydroxyl groups or $C_1$–$C_4$-alkoxycarbonyl groups, or are each a group of the formula —$CR^1R^2$—$PO_3H_2$, —$CH_2$—COOH or —$CH_2$—CH(OH)—$R^1$, where at least one of the radicals $R^3$ to $R^6$ is the group —$CR^1R^2$—$PO_3H_2$ and at least a further one of these radicals is $C_6$–$C_{30}$-alkyl, $C_6$–$C_{30}$-alkenyl, $C_7$–$C_{18}$-aralkyl, unsubstituted or substituted $C_6$–$C_{14}$-aryl or the group —$CH_2$—CH(OH)—$R^9$, where $R^9$ is $C_6$–$C_{30}$-alkyl, $C_6$–$C_{30}$-alkenyl, $C_7$–$C_{18}$-aralkyl or unsubstituted or substituted $C_6$–$C_{14}$-aryl, and where $R^1$ and $R^2$ are as defined above, A is a $C_1$–$C_{12}$-alkylene group which can additionally bear as substituents up to three $C_1$–$C_{30}$-alkyl groups, $C_2$–$C_{30}$-alkenyl groups, $C_7$–$C_{18}$-aralkyl groups or $C_6$–$C_{14}$-aryl groups which can in turn be substituted by up to three $C_1$–$C_{12}$-alkyl groups, $C_1$–$C_{12}$-alkoxy groups, halogen atoms, cyano groups, hydroxyl groups or $C_1$–$C_4$-alkoxycarbonyl groups, where, if a plurality of groups A are present, these can be identical or different, and p is a number from 0 to 30,000.

The compounds II can be in the form of monomers (p=0), oligomers or polymers.

Suitable straight-chain or branched alkyl radicals as $R^1$ to $R^9$ and as substituents on aryl groups, which are mentioned as $C_1$–$C_{30}$-, $C_6$–$C_{30}$- or $C_1$–$C_{12}$-alkyl radicals, are, for example, methyl, ethyl, n-propyl, iso-propyl-, n-butyl, iso-butyl, sec-butyl, tert-butyl, n-amyl, iso-amyl, sec-amyl, tert-amyl, neopentyl, n-hexyl, n-heptyl, n-octyl, 2-ethylhexyl, n-nonyl, iso-nonyl, n-decyl, n-undecyl, n-dodecyl, n-tridecyl, iso-tridecyl, n-tetradecyl, n-pentadecyl, n-hexadecyl, n-heptadecyl, n-octadecyl and n-eicosyl.

Suitable alkyl radicals additionally bearing up to 15, in particular up to 10, especially up to 5, hydroxyl groups and/or interrupted by up to 14, in particular by up to 9, especially by up to 4, non-adjacent oxygen atoms are, for example, corresponding polyoxyalkylene chains, in particular polyoxyethylene chains, whose terminal hydroxyl groups can be etherified by alkyl radicals, for example groups of the formula —$CH_2CH_2$—OH, —$CH_2CH_2$—O—$CH_3$, —$CH_2CH_2$—O—$CH_2CH_2$—OH, —$CH_2CH_2$—O—$CH_2CH_2$—O—$CH_3$, —$CH_2CH_2CH_2$—OH, —$CH_2CH_2CH_2$—O—$CH_2CH_3$, —$CH_2CH_2$—O—$CH_2CH_2$—O—$CH_2CH_2$—OH or —$CH_2CH_2$—O—$CH_2CH_2$—O—$CH_2CH_2$—OH.

Among these, preferred radicals as $R^1$ and $R^2$ and as substituents on aryl groups are in general lower alkyl radicals, in particular $C_1$–$C_{12}$-alkyl radicals, but especially $C_1$–$C_4$-alkyl radicals, in particular ethyl and methyl.

Particularly suitable long-chain $C_6$–$C_{30}$-alkyl radicals $R^3$ to $R^9$ are $C_8$–$C_{20}$-alkyl radicals. Here, radicals having a low degree of ranching, ie. having up to 5 methyl or ethyl side chains, are often particularly effective.

Suitable straight-chain or branched $C_2$–$C_{30}$- or $C_6$–$C_{30}$-alkenyl radicals as $R^1$ to $R^9$ are, for example, vinyl, allyl, methallyl and but-2-enyl and also, as long-chain radicals, oleyl, linoleyl and linolenyl.

Suitable $C_7$–$C_{18}$-aralkyl radicals as $R^1$ to $R^{10}$ are, for example, naphthylmethyl, diphenylmethyl or methylbenzyl, but particularly $C_7$–$C_{18}$-phenylalkyl such as 1-phenylethyl, 2-phenylethyl, 1-phenylpropyl, 2-phenylpropyl, 3-phenylpropyl, 2-phenylprop-2-yl, 4-phenylbutyl, 2,2-dimethyl-2-phenylethyl, 5-phenylamyl, 10-phenyldecyl, 12-phenyldodecyl or especially benzyl.

Suitable $C_6$–$C_{14}$-aryl radicals as $R^1$ to $R^{10}$ are, for example, biphenyl, naphthyl, anthryl and especially phenyl, which can each be substituted as indicated. If such substituents are present on phenyl rings, the preferred degree of substitution is 2 or in particular 1. Monosubstituted phenyl radicals are substituted in the ortho, meta or preferably para positions, disubstituted phenyl radicals frequently have a 2,4 substitution pattern and trisubstituted phenyl radicals often have a 2,4,6 substitution pattern. If two or three substituents are present, these can be identical or different.

Typical substituents on the aryl radicals, in particular on the phenyl rings, are methyl groups (o-, m-, p-tolyl, 2,4-dimethylphenyl, mesityl), methoxy groups, methoxycarbonyl and ethoxycarbonyl groups.

Besides methoxy, further suitable straight-chain or branched $C_1$–$C_{12}$-alkoxy groups, in particular as substituents on the phenyl ring, are especially $C_2$–$C_4$-alkoxy groups such as ethoxy, n-propoxy, iso-propoxy, n-butoxy, iso-butoxy, sec-butoxy and tert-butoxy, but also n-pentoxy, n-hexoxy, iso-hexoxy, n-heptoxy, iso-heptoxy, n-octoxy, 2-ethylhexoxy, iso-octoxy, n-nonoxy, n-decoxy, n-undecoxy and n-dodecoxy.

For the purposes of the present invention, halogen atoms are fluorine, iodine, but especially bromine and in particular chlorine.

Groups of the formula —$CH_2$—CH(OH)—$R^9$ are derived, for example, from long-chain epoxidized α-olefins such as 1,2-epoxyhexane, 1,2-epoxyoctane, 1,2-epoxydecane, 1,2-epoxydodecane, 1,2-epoxytetradecane, 1,2-epoxyhexadecane or 1,2-epoxyoctadecane or from styrene oxide.

The bridge A is preferably a $C_2$–$C_8$-alkylene group, in particular a $C_3$–$C_6$-alkylene group. A can be branched or preferably straight-chain, ie. have a polymethylene structure. Typical examples of A are methylene, 1,2-ethylene, 1,2-propylene, 1,3-propylene, dimethylmethylene, ethylmethylene, 1,2-butylene, 1,3-butylene, 2,3-butylene, 1,4-butylene, pentamethylene, hexamethylene and octamethylene.

If a plurality of groups A are present, these can also be different, eg. the group of the formula

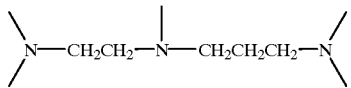

can be present as structural element.

If A is substituted by the radicals indicated, these substituents are as defined above for $R^1$ to $R^6$.

The degree of oligomerization or polymerization p is, in the case of oligomers, preferably from 0 to 20, in particular from 0 to 5, especially 0 or 1, and in the case of polymers is preferably from 20 to 30,000, in particular from 20 to 5000, especially from 20 to 100.

Typical examples of monomeric compounds II (p=0) are structures of the following types:

Typical examples of oligomeric compounds II (usually p=1) are structures of the following types:

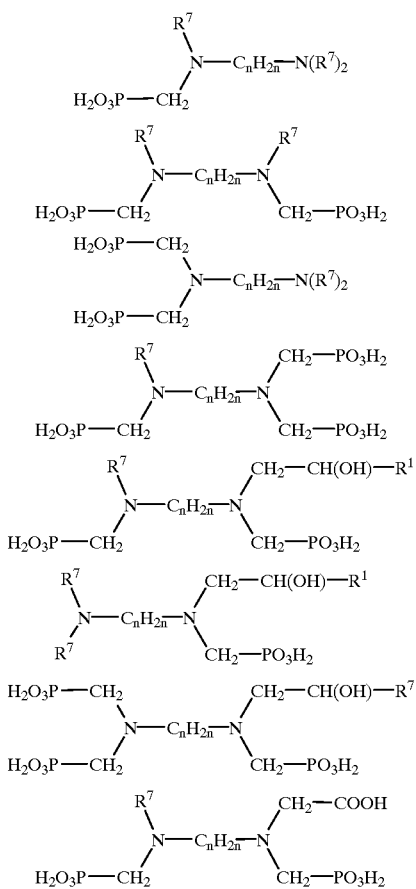

In these formulae, $R^7$ is $C_6$–$C_{30}$-alkyl or $C_6$–$C_{30}$-alkenyl, n is a number from 2 to 6 and $R^1$ is as defined above.

Typical examples of polymeric hydrocarbon-soluble aminomethylenephosphonic acid derivatives for the purposes of the present invention are polyalkylenepolyamines and polyalkylenepolyamides containing at least one group of the formula —$CR^1R^2$—$PO_3H_2$ and at least one further $C_6$–$C_{30}$-alkyl radical, $C_6$–$C_{30}$-alkenyl radical, $C_7$–$C_{18}$-aralkyl radical, unsubstituted or substituted $C_6$–$C_{14}$-aryl radical or a group of the formula —$CH_2$—$CH(OH)$—$R^9$, where $R^1$, $R^2$ and $R^9$ are as defined above, in particular correspondingly substituted polyethyleneimines, polyvinylamines and polyacrylamides, for example of the structure:

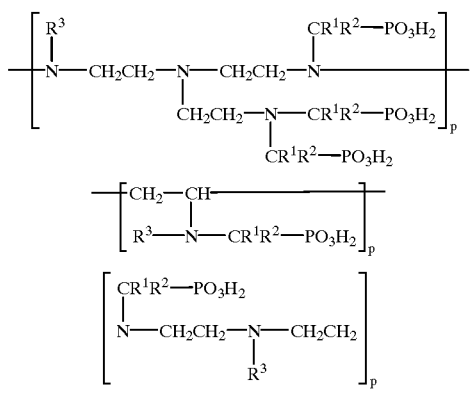

In these formulae, $R^3$ and p are as defined above.

The polyalkylenepolyamines described can have linear or branched structures. The bridges between the nitrogen atoms in the main polymer chain are preferably ethylene or propylene groups, but also methylene, butylene, pentylene or hexylene groups, or mixtures thereof.

To slightly modify the properties of the polyalkylenepolyamines described for the purposes of optimizing them for the application according to the present invention, these polymers can, to an appropriate degree, be functionalized with suitable end groups, crosslinked or made available as copolymers or graft polymers.

To introduce suitable end groups, the polyalkylenepolyamines can be reacted with $C_1$–$C_{30}$-alkyl halides, eg. methyl iodide, ethyl chloride or ethyl bromide, with benzyl halides, with halohydrins, eg. chlorohydrin, with polyalkylene oxides, with epoxidized $\alpha$—$C_3$–$C_{30}$-olefins, with isocyanates or with $C_1$–$C_{30}$-monocarboxylic acids.

Suitable crosslinkers are, for example, epihalohydrins, eg. epichlorohydrin, $\alpha,\omega$-bis(epoxides), $\alpha,\omega$- or vicinal dichloroalkanes, eg. 1,2-dichloroethane, $C_2$–$C_{30}$-dicarboxylic acids, eg. adipic acid, and diisocyanates, eg. hexamethylene diisocyanate.

Suitable polyvinylamine copolymers comprise, for example, as other monoethylenically unsaturated monomers, vinyl esters of saturated carboxylic acids having from 1 to 6 carbon atoms, eg. vinyl acetate, vinyl propionate and vinyl butyrate, monoethylenically unsaturated $C_3$–$C_8$-carboxylic acids such as acrylic acid, methacrylic acid, dimethylacrylic acid, ethacrylic acid, crotonic acid, vinylacetic acid, allylacetic acid, maleic acid, fumaric acid, citraconic acid and itaconic acid and also their esters, anhydrides, amides and nitriles. Anhydrides which are preferably used are, for example, maleic anhydride, citraconic anhydride and itaconic anhydride. Suitable esters are derived, for example, from alcohols having from 1 to 6 carbon atoms, for example methyl acrylate, methyl methacrylate, ethyl acrylate, ethyl methacrylate, isobutyl acrylate and hexyl acrylate, or from glycols or polyalkylene glycols, where in each case only one OH group of the glycol or polyglycol is esterified with a monoethylenically unsaturated carboxylic acid, eg. hydroxyethyl acrylate, hydroxyethyl methacrylate, hydroxypropyl acrylate, hydroxypropyl methacrylate, hydroxybutyl acrylate, hydroxybutyl methacrylate and also acrylic monoesters of polyalkylene glycols having a molecular weight of up to 10,000. Also suitable are esters of the above carboxylic acids with aminoalcohols, eg. dimethylaminoethyl acrylate, dimethylaminoethyl methacrylate, diethylaminoethyl acrylate, diethylaminoethyl methacrylate, dimethylaminopropyl acrylate and dimethylaminopropyl methacrylate. Suitable amides are, for example, acrylamides and methacrylamides such as N-alkylamides and N,N-dialkylamides having alkyl radicals of from 1 to 6 carbon atoms, eg. N-methylacrylamide, N,N-dimethylacrylamide, N-methylmethacrylamide, N-ethylacrylamide, N-propylacrylamide and tert-butylacrylamide and also basic amides such as dimethylaminoethylacrylamide, dimethylaminoethylmethacrylamide, diethylaminoethylmethacrylamide, diethylaminoethylacrylamide, dimethylaminopropylacrylamide, diethylaminopropylacrylamide, diethylaminopropylmethacrylamide and dimethylaminopropylmethacrylamide. The basic acrylates and acrylamides can be used in the form of the free bases, the salts with mineral acids or carboxylic acids or else in quaternized form. Also suitable as comonomers are acrylonitrile, methacrylonitrile, N-vinylpyrrolidone, N-vinylcaprolactam, N-vinylimidazole and also substituted N-imidazoles such as N-vinyl-2-methylimidazole and N-vinyl-2-ethylimidazole and N-vinylimidazoline and substituted N-vinylimidazolines, eg. N-vinyl-2-methylimidazoline. Apart from the monomers mentioned, it is also possible to use monomers containing sulfo groups, for example vinylsulfonic acid, allylsulfonic acid, styrenesulfonic acid and 3-sulfopropyl esters of acrylic acid as other monoethylenically unsaturated monomers.

The copolymers specified have K values of from 10 to 300, preferably from 20 to 200. The K values are determined by the method of H. Fikentscher in 5% strength aqueous sodium chloride solution at pH 7, 25° C. and a polymer concentration of 0.1% by weight.

It is also possible to use polyethyleneimines grafted onto polyvinylamines.

For the use according to the present invention of the compounds II and the specified polyalkylenepolyamines the presence of at least one methylenephosphonic acid group —$CR^1R^2$—$PO_3H_2$ and at least one hydrophobic radical, ie. an aromatic group or preferably a saturated or unsaturated long-chain aliphatic radical ($C_6$–$C_{30}$-alk(en)yl), is of decisive importance. The methylenephosphonic acid groups are essentially responsible for the selective complexation (extraction) of the metal ions and the hydrophobic radicals make the compounds soluble in hydrocarbons.

The hydrocarbon-soluble aminomethylenephosphonic acid derivatives to be used according to the present invention can be prepared by customary methods. Compounds having $R^1$=$R^2$=hydrogen can be obtained most simply by reacting appropriate amines with formaldehyde (or paraformaldehyde) and phosphorous acid with acid catalysis (eg. inorganic acids or mineral acids such as sulfuric acid or hydrochloric acid, sulfonic acids such as p-toluenesulfonic acid or methanesulfonic acid or carboxylic acids such as a mixture of acetic acid and acetic anhydride).

Such reactions of amines with formaldehyde and phosphorous acid are usually carried out at from 0 to 150° C., in particular from 50 to 120° C., especially from 80 to 110° C. Amine, formaldehyde and phosphorous acid are advantageously used in a molar ratio of 1:(2–6):(1–4) based on one N—H bond.

Alternatively, these compounds can also be obtained by hydrolysis of the corresponding phosphonic esters, obtainable by reaction with phosphites in place of phosphorous acid.

Another synthetic route which is of particular interest for compounds having $R^1$, $R^2$≠H starts out from aldehydes (eg. of the formula $R^1$—CHO) or ketones (eg. of the formula $R^1$—CO—$R^2$) and the appropriate primary amines which are reacted to form imines onto which phosphorous acid is then added.

The term solvent extraction customarily refers to extraction processes in which two liquid phases which are sparingly miscible or immiscible with one another are brought into intimate contact and a transfer of one or more components, here metal ions, from one phase into the other takes place. In this process, an equilibrium dependent on various external parameters is usually established. Important parameters in this context are the residence time (contact time), the temperature, the concentration (composition of the mixture) and the pH.

The hydrocarbon-soluble aminomethylenephosphonic acid derivatives described are particularly suitable for the solvent extraction of one or more metal ions from the group consisting of magnesium, vanadium, chromium, molybdenum, manganese, cobalt, nickel, copper, zinc, cadmium, aluminum, gallium, tin and arsenic from aqueous solutions.

In particular, the hydrocarbon-soluble aminomethylenephosphonic acid derivatives described serve for the separation of one or more metal ions from the group consisting of magnesium, vanadium, chromium, molybdenum, manganese, iron, cobalt, nickel, copper, zinc, cadmium, aluminum, gallium, tin, arsenic and bismuth in aqueous solution from one or more other metal ions from the same group by solvent extraction, with the separations of iron ions from zinc ions and iron ions from copper ions being excepted.

The order of extraction of the individual metal ions or groups of metal ions from the others of the specified group is dependent on the pH of the aqueous solution. One type of metal ion is separated from another by the present process if its $pH_{1/2}$ value is greater than the $pH_{1/2}$ value of the other type of ion. Details may be found below in the experimental examples.

The aqueous solutions of the metal ions used for the separation or removal are generally acid solutions which usually have pH values of from <0 to about 7. The metal contents of the aqueous solutions used can vary greatly. The metal salt solutions usually contain from 0.1 ppm to 80% by weight, usually from 1 ppm to 50% by weight, particularly from 5 ppm to 30% by weight, of metal. The solutions additionally contain up to 800 g/l of free acids, in particular sulfuric acid, hydrochloric acid, phosphoric acid, nitric acid and/or hydrofluoric acid), preferably from 1 to 400 g/l of free acid. Basic, eg. ammoniacal, solutions can also be used under some circumstances.

In the extraction, one or more metals are together transferred as a function of the pH into the organic solutions comprising aminomethylenephosphonic acid derivatives and, if desired, modifiers. Apart from the pH, the parameters contact time, temperature and concentration of extractants, and of modifier if used, play a role in the extraction.

The contact time is usually from 1 to 90 minutes, in particular from 5 to 45 minutes. The temperature during the extraction is normally in the range from 15 to 90° C., in particular from 20 to 60° C.

For the purposes of the present invention, organic solutions of the aminomethylenephosphonic acid derivatives described are used. Suitable organic solvents are, for example, aliphatic, cycloaliphatic or aromatic hydrocarbons or mixtures of these having a high boiling point, halogenated hydrocarbons, ketones or ethers having a high boiling point or else mixtures of such compounds. Preference is given to using petroleum hydrocarbons such as kerosene.

The monomeric and oligomeric aminomethylenephosphonic acid derivatives described generally have a concentration in the specified organic solvents of from 0.01 to 8 mol/l, in particular from 0.05 to 3 mol/l, especially from 0.1 to 1 mol/l. Polymeric aminomethylenephosphonic acid derivatives such as the corresponding polyethyleneimine or polyvinylamine derivatives generally have concentrations of from 0.5 to 800 g/l, in particular from 5 to 600 g/l, especially from 50 to 300 g/l.

Finally, the mass ratios of organic and aqueous phases used also play a role, with the ratios of organic phase to aqueous phase generally being from 1:20 to 20:1, preferably from 1:10 to 10:1, in particular from 1:5 to 5:1.

The solvent extraction of the present invention can be carried out on a laboratory scale or on an industrial scale, batchwise or continuously (eg. in a mixer settler plant or in pulse columns).

The separation of the metals extracted from the organic solutions and the recovery of the extractants (complexing agents) used and any further auxiliaries concomitantly used can be carried out by conventional methods.

In addition to the actual extractants (complexing agents), "modifiers" are usually used in the solvent extraction. The term "modifiers" refers to compounds which either effect a better or more rapid phase separation, accelerate the transfer of the components to be extracted from one phase to the other or improve the solubility of the metal complex formed in the organic diluent phase.

Modifiers known from the prior art are, for example, straight-chain or branched long-chain alcohols having from 10 to 22 carbon atoms, for example isodecanol, isotridecanol or hexadecanol, phenols or esters of such alcohols and phenols with lower carboxylic acids or relatively long-chain fatty acids. Furthermore, it is possible to use alkoxylated alcohols and alkoxylated amines as are described as modifiers in (4).

The modifiers are used together with the extractant (complexing agent) in a weight ratio of extractant to modifier of generally from 99.5:0.5 to 0.5:99.5, preferably from 95:5 to 5:95, in particular from 80:20 to 20:80. Mixtures of various extractants and various types of modifier can also be used. They are used in the abovementioned organic solvents.

The hydrocarbon-soluble aminomethylenephosphonic acid derivatives used according to the present invention as extractants in the solvent extraction make it possible to selectively remove metal ions or separate them from one another to a high degree of efficiency. The loading capacity of the extractant used according to the present invention is above average.

EXAMPLES

Unless otherwise indicated, percentages given below are by weight.

A possible synthesis of the extractants used according to the present invention is described below by way of example.

The reaction product described below can be separated off directly as organic phase, extracted with an organic solvent in which it is soluble or be salted out of the aqueous phase using sodium sulfate and subsequently be repeatedly washed with water to purify it. The degree of phosphonomethylation was determined from the P/N ratio by means of elemental analysis.

Example 1

Reaction Product of di-2-ethylhexylamine with Phosphorous Acid and Formaldehyde 289.8 g (1.20 mol) of di-2-ethylhexylamine were initially charged and 118.1 g (1.44 mol) of phosphorous acid dissolved in 160 ml of water were added dropwise. Subsequently, 85.2 g of concentrated sulfuric acid which had been diluted with 75 ml of water were added. The mixture obtained was heated to about 100° C. and 247 g (3.0 mol) of aqueous formaldehyde solution (36.5% strength) were added dropwise. The mixture was refluxed for 40 hours and the organic phase was then separated off and washed 3 times with 500 ml each time of water. Remaining water in the washed organic phase was removed in a water pump vacuum. Yield: 370 g of a yellow viscous oil (92% of theory); by-product: methyldi(2-ethylhexylamine); elemental analysis: $P_{found}$ 7.1%, $N_{found}$ 4.3%.

The following examples illustrate the use according to the present invention of aminomethylenephosphonic acid derivatives, but do not limit the scope of the invention.

The extractability of metal ions from aqueous solutions was determined in a batchwise mode (stirring tests).

Examples 2 to 18

Extraction Tests

Solvent Extraction of Various Metals from Aqueous Solutions

Aqueous synthetic metal salt solutions containing 1 g/l of metal, together for ($Fe^{3+}$, $Cu^{2+}$, $Zn^{2+}$, $Al^{3+}$), ($Mg^{2+}$, $Ni^{2+}$, $Co^{2+}$, $Cd^{2+}$) and ($Cr^{3+}$, $Mn^{2+}$) or individually for $V^{5+}$, $Mo^{6+}$, $Ga^{3+}$, $Ge^{4+}$, $Sn^{2+}$, $As^{3+}$ and $Bi^{3+}$ were prepared in a sulfate-containing medium (200 g/l of sulfuric acid), with the corresponding sulfates or oxides (reagent grade or analytical reagent) being used.

The aqueous phases (aq.) were intimately mixed for 30 minutes at room temperature (20–25° C.) with the organic phases (org.) consisting of 15% (w/v) of extractant (Example 1) and 15% (w/v) of isodecanol in LK[1], in an org./aq. ratio of 1:1, with the appropriate pH being set by addition of sodium hydroxide solution. The pH was monitored and kept constant. The metal or the metals were extracted from the aqueous phase into the organic phase. After the extraction, the phases were separated and the metal contents of the two phases were determined in each case.

The results (Examples 2 to 18) for the various metals are shown in Tables 1 to 17[2]).

Example 2

Magnesium Extraction

TABLE 1

| | Magnesium (Mg(II)) | | |
|---|---|---|---|
| $pH_{eq}$ | $[Mg]_{aq}$ in mg/l | $[Mg]_{org}$ in mg/l | $Mg_{extr.}$ (%) |
| 1.7 | 970.0 | 4.2 | 0.4 |
| 2.0 | 956.0 | 3.7 | 0.4 |
| 3.0 | 934.0 | 10.4 | 1.0 |
| 4.0 | 897.0 | 121.1 | 12.0 |
| 5.0 | 700.0 | 273.1 | 27.0 |
| 5.5 | 322.6 | 673.1 | 66.6 |
| 6.0 | 138.0 | 865.9 | 85.7 |
| 7.0 | 12.3 | 997.1 | 98.7 |

Example 3

Vanadium Extraction

TABLE 2

| | Vanadium (V(V)) | | |
|---|---|---|---|
| $pH_{eq}$ | $[V]_{aq}$ in mg/l | $[V]_{org}$ in mg/l | $V_{extr.}$ (%) |
| 0.0 | 553.3 | 291.2 | 34.5 |
| 0.2 | 514.9 | 339.1 | 39.7 |
| 1.1 | 266.1 | 538.5 | 63.1 |
| 2.0 | 40.8 | 811.5 | 95.0 |
| 3.0 | 2.3 | 851.6 | 99.7 |
| 4.0 | 0.4 | 853.6 | 100.0 |

1) Lamp kerosene in accordance with DIN 51 636 (Wintershall):
Boiling range 180–250° C.
Density (15° C.) 0.798 g/cm³
Viscosity (20° C.) 2 mm²/s (cSt)
Flashpoint AP >55° C.
Aromatics content (FIA) 13%
2) Note: The value for pH 0.0 corresponds to the initial equilibrium value established between the two phases when the aqueous solution used is made up using 200 g/l of sulfuric acid (ie. sometimes negative pH values).

Example 4

Chromium Extraction

TABLE 3

| $pH_{eq}$ | Chromium (Cr(III)) | | |
|---|---|---|---|
| | $[Cr]_{aq}$ in mg/l | $[Cr]_{org}$ in mg/l | $Cr_{extr.}$ (%) |
| 1.4 | 871.3 | 1.4 | 0.1 |
| 2.0 | 886.4 | 2.4 | 0.2 |
| 3.0 | 983.9 | 5.4 | 0.5 |
| 4.0 | 477.5 | 219.4 | 22.2 |
| 5.0 | 71.5 | 738.4 | 74.8 |
| 6.0 | 1.6 | 840.5 | 85.1 |
| 7.0 | 3.3 | 860.2 | 87.1 |

Example 5

Molybdenum Extraction

TABLE 4

| $pH_{eq}$ | Molybdenum (Mo(VI)) | | |
|---|---|---|---|
| | $[Mo]_{aq}$ in mg/l | $[Mo]_{org}$ in mg/l | $Mo_{extr.}$ (%) |
| 0.0 | 0.5 | 728.5 | 99.9 |
| 0.2 | 0.1 | 681.8 | 100.0 |
| 1.0 | 0.2 | 681.7 | 100.0 |

Example 6

Manganese Extraction

TABLE 5

| $pH_{eq}$ | Manganese (Mn(II)) | | |
|---|---|---|---|
| | $[Mn]_{aq}$ in mg/l | $[Mn]_{org}$ in mg/l | $Mn_{extr.}$ (%) |
| 1.4 | 825.6 | 15.2 | 1.5 |
| 2.0 | 832.8 | 21.4 | 2.1 |
| 3.0 | 813.6 | 59.2 | 5.8 |
| 4.0 | 357.0 | 518.5 | 50.7 |
| 5.0 | 32.1 | 883.9 | 86.4 |
| 6.0 | 0.8 | 921.5 | 90.1 |
| 7.0 | 0.6 | 964.5 | 94.3 |

Example 7

Iron Extraction

TABLE 6

| $pH_{eq}$ | Iron (Fe(III)) | | |
|---|---|---|---|
| | $[Fe]_{aq}$ in mg/l | $[Fe]_{org}$ in mg/l | $Fe_{extr.}$ (%) |
| 0.2 | 3.6 | 971.0 | 100.0 |
| 0.6 | 0.8 | 992.0 | 100.0 |
| 1.3 | 0.4 | 1020.0 | 100.0 |
| 2.0 | 0.1 | 1020.0 | 100.0 |
| 3.0 | 0.1 | 1020.0 | 100.0 |
| 5.0 | 0.1 | 1020.0 | 100.0 |
| 7.0 | 0.1 | 1020.0 | 100.0 |

Example 8

Cobalt Extraction

TABLE 7

| $pH_{eq}$ | Cobalt (Co(II)) | | |
|---|---|---|---|
| | $[Co]_{aq}$ in mg/l | $[Co]_{org}$ in mg/l | $Co_{extr.}$ (%) |
| 1.7 | 978.5 | 5.7 | 0.5 |
| 2.0 | 968.1 | 1.7 | 0.2 |
| 3.0 | 937.8 | 31.9 | 3.0 |
| 4.0 | 808.6 | 122.8 | 11.5 |
| 4.5 | 484.8 | 447.0 | 47.1 |
| 5.0 | 99.1 | 986.6 | 90.2 |
| 5.5 | 20.4 | 940.5 | 97.8 |
| 6.0 | 5.2 | 956.4 | 99.4 |
| 7.0 | 0.6 | 961.2 | 99.9 |

Example 9

Nickel Extraction

TABLE 8

| $pH_{eq}$ | Nickel (Ni(II)) | | |
|---|---|---|---|
| | $[Ni]_{aq}$ in mg/l | $[Ni]_{org}$ in mg/l | $Ni_{extr.}$ (%) |
| 1.7 | 853.0 | 0.1 | 0.0 |
| 2.0 | 853.6 | 0.6 | 0.1 |
| 3.0 | 858.6 | 1.0 | 0.1 |
| 4.0 | 825.2 | 45.3 | 4.3 |
| 5.0 | 746.0 | 264.3 | 26.2 |
| 5.5 | 311.0 | 637.0 | 63.1 |
| 6.0 | 10.3 | 898.2 | 88.9 |
| 7.0 | 0.6 | 998.9 | 98.9 |

Example 10

Copper Extraction

TABLE 9

| $pH_{eq}$ | Copper (Cu(II)) | | |
|---|---|---|---|
| | $[Cu]_{aq}$ in mg/l | $[Cu]_{org}$ in mg/l | $Cu_{extr.}$ (%) |
| 0.2 | 972.0 | 1.0 | 0.0 |
| 1.3 | 970.0 | 1.8 | 0.0 |
| 1.7 | 951.0 | 3.0 | 0.0 |
| 2.0 | 945.0 | 6.7 | 1.0 |
| 2.5 | 860.0 | 95.9 | 10.0 |
| 3.0 | 740.0 | 210.3 | 22.0 |
| 4.0 | 450.0 | 500.0 | 51.0 |
| 5.0 | 82.9 | 889.6 | 91.0 |
| 6.0 | 2.0 | 972.8 | 100.0 |
| 7.0 | 2.0 | 972.9 | 100.0 |

Example 11

Zinc Extraction

TABLE 10

| $pH_{eq}$ | Zinc (Zn(II)) | | |
|---|---|---|---|
| | $[Zn]_{aq}$ in mg/l | $[Zn]_{org}$ in mg/l | $Zn_{extr.}$ (%) |
| 0.2 | 1027.0 | 48.0 | 4.0 |
| 0.6 | 968.0 | 69.9 | 7.0 |
| 1.2 | 948.0 | 73.0 | 8.0 |
| 1.3 | 902.0 | 80.0 | 10.0 |
| 1.7 | 862.0 | 113.0 | 12.0 |
| 2.0 | 840.0 | 201.0 | 19.0 |

TABLE 10-continued

Zinc (Zn(II))

| pH$_{eq}$ | [Zn]$_{aq}$ in mg/l | [Zn]$_{org}$ in mg/l | Zn$_{extr.}$ (%) |
|---|---|---|---|
| 2.5 | 700.0 | 334.0 | 32.0 |
| 3.0 | 506.0 | 527.0 | 50.0 |
| 4.0 | 78.0 | 968.0 | 92.0 |
| 5.0 | 1.5 | 1048.0 | 100.0 |
| 6.0 | 0.1 | 1050.0 | 100.0 |
| 7.0 | 0.1 | 1050.0 | 100.0 |

Example 12
Cadmium Extraction

TABLE 11

Cadmium (Cd(II))

| pH$_{eq}$ | [Cd]$_{aq}$ in mg/l | [Cd]$_{org}$ in mg/l | Cd$_{extr.}$ (%) |
|---|---|---|---|
| 1.7 | 801.6 | 29.9 | 3.0 |
| 2.0 | 799.0 | 29.4 | 2.9 |
| 3.0 | 724.9 | 104.6 | 10.4 |
| 3.5 | 539.9 | 315.4 | 36.0 |
| 4.0 | 103.2 | 813.0 | 81.2 |
| 4.5 | 52.0 | 818.9 | 94.0 |
| 5.0 | 10.6 | 895.2 | 98.8 |
| 5.5 | 1.0 | 905.2 | 99.9 |
| 6.0 | 0.1 | 906.1 | 100.0 |
| 7.0 | 0.0 | 906.2 | 100.0 |

Example 13
Aluminum Extraction

TABLE 12

Aluminum (Al(III))

| pH$_{eq}$ | [Al]$_{aq}$ in mg/l | [Al]$_{org}$ in mg/l | Al$_{extr.}$ (%) |
|---|---|---|---|
| 0.2 | 760.0 | 188.0 | 20.0 |
| 0.6 | 705.0 | 231.0 | 25.0 |
| 1.2 | 540.0 | 379.8 | 41.0 |
| 1.3 | 472.0 | 451.0 | 49.0 |
| 1.7 | 330.0 | 625.0 | 65.0 |
| 2.0 | 180.3 | 743.2 | 80.0 |
| 2.5 | 63.1 | 861.0 | 93.0 |
| 3.0 | 20.0 | 904.9 | 98.0 |
| 4.0 | 0.3 | 925.2 | 100.0 |

Example 14
Gallium Extraction

TABLE 13

Gallium (Ga(III))

| pH$_{eq}$ | [Ga]$_{aq}$ in mg/l | [Ga]$_{org}$ in mg/l | Ga$_{extr.}$ (%) |
|---|---|---|---|
| 0.0 | 699.1 | 305.2 | 30.4 |
| 0.2 | 613.1 | 337.8 | 35.5 |
| 1.1 | 122.2 | 804.6 | 84.6 |
| 2.0 | 16.9 | 933.4 | 98.2 |
| 3.0 | 1.3 | 949.5 | 99.9 |
| 4.0 | 1.0 | 949.8 | 99.9 |

Example 15
Germanium Extraction

TABLE 14

Germanium (Ge(IV))

| pH$_{eq}$ | [Ge]$_{aq}$ in mg/l | [Ge]$_{org}$ in mg/l | Ge$_{extr.}$ (%) |
|---|---|---|---|
| 0.0 | 202.5 | 676.3 | 77.0 |
| 0.3 | 560.0 | 303.0 | 35.1 |
| 1.0 | 652.0 | 80.7 | 9.3 |
| 2.0 | 652.8 | 178.2 | 20.6 |
| 3.0 | 639.0 | 215.4 | 25.0 |
| 4.0 | 636.3 | 226.7 | 26.3 |

Example 16
Tin Extraction

TABLE 15

Tin (Sn(II))

| pH$_{eq}$ | [Sn]$_{aq}$ in mg/l | [Sn]$_{org}$ in mg/l | Sn$_{extr.}$ (%) |
|---|---|---|---|
| 0.0 | 131.9 | 810.0 | 86.0 |
| 0.2 | 34.5 | 943.0 | 96.4 |
| 1.0 | 20.0 | 953.5 | 97.6 |
| 2.0 | 5.8 | 971.3 | 99.4 |
| 3.0 | 3.0 | 974.4 | 99.7 |
| 4.0 | 2.7 | 974.7 | 99.7 |

Example 17
Arsenic Extraction

TABLE 16

Arsinic (As(III))

| pH$_{eq}$ | [As]$_{aq}$ in mg/l | [As]$_{org}$ in mg/l | As$_{extr.}$ (%) |
|---|---|---|---|
| 0.0 | 931.7 | 20.3 | 2.1 |
| 0.1 | 932.8 | 46.8 | 4.8 |
| 1.0 | 741.4 | 80.5 | 8.2 |
| 2.0 | 756.7 | 188.5 | 19.2 |
| 3.0 | 774.5 | 198.1 | 20.2 |
| 4.0 | 744.8 | 234.8 | 24.0 |
| 5.0 | 672.5 | 307.1 | 31.4 |

Example 18
Bismuth Extraction

TABLE 17

Bismuth (Bi(III))

| pH$_{eq}$ | [Bi]$_{aq}$ in mg/l | [Bi]$_{org}$ in mg/l | Bi$_{extr.}$ (%) |
|---|---|---|---|
| 0.0 | 119.8 | 785.7 | 87.0 |
| 0.2 | 38.2 | 869.3 | 95.8 |
| 1.0 | 7.0 | 899.2 | 99.1 |
| 2.0 | 3.7 | 903.7 | 99.6 |
| 3.0 | 3.0 | 904.5 | 99.7 |
| 4.0 | 2.9 | 904.5 | 99.7 |

On the basis of the extraction data, the pH$_{1/2}$ values[3]) derived therefrom can be used to produce a list from which the order of extraction of the metals studied can be derived (see Table 18).

[3]). Equilibrium pH at which 50% of metal is extracted at an org./aq. phase ration of 1:1.

TABLE 18

Order of extraction according to pH½ values

| Metals | pH½ |
|---|---|
| Fe (III) | < <<0 |
| Mo (VI) | < <0 |
| Sn (II) | <0 |
| Bi (III) | <0 |
| Ga (III) | 0.4 |
| V (V) | 0.5 |
| Al (III) | 1.2 |
| Zn (II) | 2.8 |
| Cd (II) | 3.6 |
| Mn (II) | 3.8 |
| Cu (II) | 3.9 |
| Cr (III) | 4.2 |
| Co (II) | 4.5 |
| Ni (II) | 5.3 |
| Mg (II) | 5.4 |
| As (III) | <5 |

If the $pH_{1/2}$ values have a sufficiently large difference, one metal can be selectively separated from the others by choosing an appropriate pH. The list in Table 19 shows, by way of example, various possible ways of separating metals or enriching or depleting mixtures thereof. The selectivity (sharpness of a separation) is in each case dependent on the pH.

TABLE 19

Separation of metals

| | | |
|---|---|---|
| Fe (III) / Mg (II) | Sn (II) / Mn (II) | Al (III) / Co (II) |
| Fe (III) / Ni (II) | Sn (II) / Cd (II) | Al (III) / Cr (II) |
| Fe (III) / Co (II) | Sn (II) / Zn (II) | Al (III) / Cu (II) |
| Fe (III) / Cr (II) | Sn (II) / Al (II) | Al (III) / Mn (II) |
| Fe (III) / Mn (II) | Sn (II) / As (III) | Al (III) / Cd (II) |
| Fe (III) / Cd (II) | Sn (II) / V (V) | Al (III) / Zn (II) |
| Fe (III) / Al (III) | Sn (II) / Ga (III) | Al (III) / As (II) |
| Fe (III) / As (III) | Bi (III) / Mg (II) | Zn (II) / Mg (II) |
| Fe (III) / V (V) | Bi (III) / Ni (II) | Zn (II) / Ni (II) |
| Fe (III) / Ga (III) | Bi (III) / Co (II) | Zn (II) / Co (II) |
| Fe (III) / Bi (III) | Bi (III) / Cr (II) | Zn (II) / Cr (II) |
| Fe (III) / Sn (III) | Bi (III) / Cu (II) | Zn (II) / Cu (II) |
| Fe (III) / Mo (VI) | Bi (III) / Mn (II) | Zn (II) / Mn (II) |
| Mo (VI) / Mg (II) | Bi (III) / Cd (II) | Zn (II) / Cd (II) |
| Mo (VI) / Ni (II) | Bi (III) / Zn (II) | Zn (II) / As (III) |
| Mo (VI) / Co (II) | Bi (III) / Al (III) | Cd (II) / Mg (II) |
| Mo (VI) / Cr (III) | Bi (III) / As (III) | Cd (II) / Ni (II) |
| Mo (VI) / Cu (II) | Bi (III) / V (V) | Cd (II) / Co (II) |
| Mo (VI) / Mn (II) | Bi (III) / Ga (III) | Cd (II) / Cr (III) |
| Mo (VI) / Cd (II) | Ga (II) / Mg (II) | Mn (II) / Mg (II) |
| Mo (VI) / Zn (II) | Ga (II) / Ni (II) | Mn (II) / Ni (II) |
| Mo (VI) / Al (III) | Ga (II) / Co (II) | Mn (II) / Co (II) |
| Mo (VI) / As (III) | Ga (II) / Cr (II) | Mn (II) / As (III) |
| Mo (VI) / (V) | Ga (II) / Cu (II) | Cu (II) / Mg (II) |
| Mo (VI) / Ga (III) | Ga (II) / Mn (II) | Cu (II) / Ni (II) |
| Mo (VI) / Bi (III) | Ga (II) / Cd (II) | Cu (II) / Co (II) |
| Mo (VI) / Sn (III) | Ga (II) / Zn (II) | Cu (II) / AS (III) |
| Sn (II) / Mg (II) | GA (II) / Al (III) | Cr (II) / Mg (II) |
| Sn (II) / Ni (II) | GA (II) / As (III) | Cr (II) / Ni (II) |
| Sn (II) / Co (II) | Ga (II) / Mn (II) | Cr (II) / Co (II) |
| Sn (II) / Cr (II) | Al (III) / Mg (II) | Co (II) / Mg (II) |
| Sn (II) / Cu (II) | Al (III) / Ni (II) | Co (II) / Ni (II) |

However, for example, it is also possible to separate Mo(VI) from Mg(II), Ni(II), Co(II), Cr(III), Cu(II), Mn(II), Cd(II), Zn(II), Al(III), V(V) and/or Ga(III).

Table 20 shows the pH ranges above which the metals can be readily extracted (at room temperature).

TABLE 20

Favorable pH ranges

| Metal | pH |
|---|---|
| Fe (III) | above <0 |
| Mo (VI) | above <0 |
| Bi (III) | 0–1 |
| Ga (III) | 1–2 |
| V (V) | 2–3 |
| Al (III) | 2–3 |
| Zn (II) | 4–5 |
| Cd (II) | 4–5 |
| Mn (II) | 5–6 |
| Cu (II) | 5–6 |
| Cr (III) | 5–6 |
| Co (II) | 5–6 |
| Ni (II) | 6–7 |
| Mg (II) | 6–7 |

It remains to be said that the extractions can also be dependent on the extraction temperature.

The solvent extraction of metals is likewise possible from chloride solutions. This is illustrated by Examples 19–22 below:

The aqueous synthetic metal salt solutions were prepared using from 500 to 1000 ppm of metal for $Fe^{3+}$, $Zn^{2+}$, $Pt^{4+}$ and $Sn^{2+}$ in a chloride-containing medium (36.5 g/l of hydrochloric acid+175–234 g/l of NaCl), with the corresponding metal chlorides (reagent grade or analytical reagent) being used.

The aqueous phases (aq.) thus prepared were intimately mixed for 10 minutes at 50° C. with the organic phases (org.) consisting of 7.5% of extractant (Example 1) and 10% of isodecanol in $LK^1$), in an org./aq. ratio of 1:2. The respective metal was extracted from the aqueous into the organic phase. After the extraction, the phases were separated and the metal contents of the two phases were determined in each case. The results are summarized in Table 21.

TABLE 21

Extraction from chloride solutions

| Example | Metal | $[M]_{feed}$ (ppm) | $[M]_{org}$ (ppm) | $[M]_{aq.}$ (ppm) | $[M]_{extr.}$ (%) |
|---|---|---|---|---|---|
| 19 | Fe (III) | 530 | 1100 | <1 | 100 |
| 20 | Sn (II) | 870 | 1700 | ≈1 | 100 |
| 21 | Pt (IV) | 870 | 1000 | 380 | 57 |
| 22 | Zn (II) | 1000 | 710 | 490 | 42 |

Determination of the Separation Performance

Examples 23–24
(Separation of 2 Metals)

The studies were carried out as pH-controlled, stirred batch tests. 250 ml of a synthetic aqueous solution (feed) containing two different metals in each case (Ca/Zn (Example 23) or Ga/Cu (Example 24) and prepared using gallium(III) nitrate, zinc(II) or copper(II) sulfate and, if appropriate, free sulfuric acid) were mixed for 30 minutes at room temperature (20–25° C.) with 100 ml of organic phase (composition: 10% of extractant, 15% of isodecanol, 75% of $LK^1$) at a pH controlled by addition of NaOH. The phases were subsequently separated and the metal contents of the aqueous and organic phases were determined. For comparison, two commercially available extractants (mono-2-ethylhexyl 2-ethylhexylphosphonate (A) and di(2-ethylhexyl) hydrogen phosphate (B)) were used. The individual results are shown in Table 22.

TABLE 22

| | Extractant | pH | Metal | [M]$_{feed}$ [%] | [M]$_{org}$ [%] | [M]$_{aq.}$ [%] | Extraction efficiency [%] |
|---|---|---|---|---|---|---|---|
| Ex. 23a | Ex. 1 | 1.2 | Ga | 0.19 | 0.31 | 0.085 | 54 |
| | | | Zn | 0.30 | 0.001 | 0.29 | |
| Ex. 23b | A | 1.2 | Ga | 0.19 | 0.009 | 0.18 | 4 |
| | | | Zn | 0.30 | 0.002 | 0.29 | |
| Ex. 23c | B | 1.2 | Ga | 0.19 | 0.069 | 0.16 | 15 |
| | | | Zn | 0.30 | 0.003 | 0.29 | |
| Ex. 24a | Ex. 1 | 1.75 | Ga | 0.18 | 0.47 | 0.035 | 80 |
| | | | Cu | 0.29 | <0.001 | 0.28 | |
| Ex. 24b | A | 1.75 | Ga | 0.18 | 0.25 | 0.10 | 44 |
| | | | Cu | 0.29 | <0.001 | 0.28 | |
| Ex. 24c | B | 1.75 | Ga | 0.18 | 0.47 | 0.035 | 80 |
| | | | Cu | 0.29 | <0.001 | 0.28 | |

In the Ga/Zn separation (at pH 1.2), the extractant used according to the present invention from Example 1 is clearly superior to both commercially available extractants (A and B). In the case of the Ga/Cu separation (at pH 1.75), the extractant used according to the present invention is clearly superior to the commercial extractant A and has the same effectiveness as the commercial extractant B.

Examples 25–26
(Selective Separation of a Metal From a Mixture)

The studies were carried out as pH-controlled, stirred batch tests. 200 ml of a synthetic aqueous solution (feed) containing four different metals in each case (Bi/Zn/Mn/Cu (Example 25) or Mo/Cu/Co/Ni (Example 26) and prepared from bismuth(III) oxide, zinc(II), manganese(II) and copper (II) sulfate or molybdenum(VI) oxide, cobalt(II), nickel(II) and copper(II) sulfate; these solutions additionally contained 100 g/l of free sulfuric acid (Example 25) or 200 g/l of free sulfuric acid (Example 26)) were mixed for 30 minutes at room temperature (20–25° C.) with 50 ml of organic phase (composition: 10% of extractant, 15% of isodecanol, 75% of LK[1])) at the pH values shown in Table 23. The phases were subsequently separated and the metal contents in the aqueous and organic phases were determined. For comparison, two commercial extractants (mono-2-ethylhexyl 2-ethylhexylphosphonate (A) and di(2-ethylhexyl) hydrogen phosphate (B)) were used. The individual results are shown in Table 23.

TABLE 23

| | Extractant | pH value | Metal | [M]$_{feed}$ [g/l] | [M]$_{org.}$ [%] | [M]$_{aq.}$ [%] | Extraction efficiency [%] |
|---|---|---|---|---|---|---|---|
| Example 25a | Example 1 | 0.1 | Bi | 1.2 | 0.45 | 0.019 | 83 |
| | | 0.1 | Zn | 1.0 | <0.001 | 0.096 | |
| | | 0.1 | Mn | 1.0 | <0.001 | 0.096 | |
| | | 0.1 | Cu | 1.0 | <0.001 | 0.094 | |
| Example 25b | A | 0.1 | Bi | 1.2 | <0.001 | 0.11 | 0 |
| | | 0.1 | Zn | 1.0 | <0.001 | 0.094 | |
| | | 0.1 | Mn | 1.0 | <0.001 | 0.095 | |
| | | 0.1 | Cu | 1.0 | <0.001 | 0.093 | |
| Example 25c | B | 0.1 | Bi | 1.2 | <0.001 | 0.11 | 0 |
| | | 0.1 | Zn | 1.0 | <0.001 | 0.093 | |
| | | 0.1 | Mn | 1.0 | <0.001 | 0.095 | |
| | | 0.1 | Cu | 1.0 | <0.001 | 0.093 | |
| Example 26a | Example 1 | <0 | Mo | 1.0 | 0.49 | <0.001 | 100 |
| | | <0 | Cu | 1.0 | <0.001 | 0.089 | |
| | | <0 | Co | 1.0 | <0.001 | 0.091 | |
| | | <0 | Ni | 1.0 | <0.001 | 0.092 | |
| Example 26b | A | <0 | Mo | 1.0 | 0.22 | 0.049 | 44 |
| | | <0 | Cu | 1.0 | <0.001 | 0.089 | |
| | | <0 | Co | 1.0 | <0.001 | 0.091 | |
| | | <0 | Ni | 1.0 | <0.001 | 0.092 | |
| Example 26c | B | <0 | Mo | 1.0 | 0.082 | 0.075 | 15 |
| | | <0 | Cu | 1.0 | <0.001 | 0.089 | |
| | | <0 | Co | 1.0 | <0.001 | 0.092 | |
| | | <0 | Ni | 1.0 | <0.001 | 0.092 | |

Both in the separation of Bi and of Mo from multimetal solutions, the extractant used according to the present invention from Example 1 is clearly superior to the two commercial extractants A and B.

Examples 27–28
(Extraction of As(III) and As(V))

As can be extracted with the extractant from example 1.

Example 27

Extraction of As(V) as a Function of pH[4)]

[4)] Organic phase: 15% extractant (example 1), 15% isodecanol, diluent (lamp kerosene) Aqueous phase: 1.0 g/l As(V) Conditions: O/A=1

TABLE 24

| pH | As (V)$_{extr.}$ (%) |
|---|---|
| \multicolumn{2}{c}{As(V) Extraction} | |
| 0.3 | 3.0 |
| 0.5 | 6.7 |
| 1.0 | 15.6 |
| 1.2 | 19.6 |
| 2.1 | 30.3 |
| 2.5 | 30.6 |

As(V) stripping is relatively easy in the presence of Fe(III).

Fe(III) plays an important role on As(V) extraction from an acidic media with the extractant from example 1. Extraction of As(V) in the presence of about 20 g/l Fe(III) is 3 times higher than in the absence of this metal; As(III) extraction remains unaltered (see table 25).

Example 28

Extraction of As(V) and As(III) in the Presence of Fe (III) [5]

[5] Organic phase: 1.5% extractant (example 1), 15% isodecanol, diluent (lamp kerosene) Aqueous phase: 0–20 g/l Fe(III), 0.5–1 g/l As(III) or As(V), 50 g/l $H_2SO_4$ Conditions: O/A=2, 50° C.

TABLE 25

| | \multicolumn{3}{c}{As Extraction} | | |
|---|---|---|---|
| [Fe]$_{aq}$ g/l | As (III)$_{extr.}$ (%)[6] | As (V)$_{extr.}$ (%)[7] | As (III)/As (V)$_{extr.}$ (%)[8] |
| 0 | 15.9 | 29.8 | 12.2 |
| 4.14 | — | — | 15.2 |
| 5.15 | 12.2 | — | — |
| 5.53 | — | 42.2 | — |
| 8.85 | — | — | 29.6 |
| 10.3 | 12.5 | — | — |
| 11.0 | — | 72.0 | — |
| 12.6 | — | — | 36.0 |
| 16.0 | 9.08 | — | — |
| 16.4 | — | 76.3 | — |
| 18.0 | — | — | 31.3 |
| 18.9 | 12.8 | — | — |
| 19.4 | — | 83.6 | — |

[6] 1 g/l As (III)
[7] 0.5 g/l As (V)
As (III):As (V) (1:1), 1 g/l

This particular capacity of the extractant (example 1) to extract As(V) in the presence of Fe(III) out of acidic media might be of commercial interest in the removal of this toxic metal from effluents and process solutions.

We claim:

1. A method of effecting solvent extraction of one or more metal ions from an aqueous solution, which comprises:

solvent extracting at least one metal ion selected from the group consisting of magnesium, vanadium, chromium, molybdenum, manganese, cobalt, nickel, zinc, cadmium, aluminum, tin, and arsenic from an aqueous solution containing at least one other metal ion selected from the group consisting of magnesium, vanadium, chromium, molybdenum, manganese, iron, cobalt, nickel, copper, zinc, cadmium, aluminum, gallium, tin, arsenic and bismuth with an organic liquid phase containing a metal ion complexing compound having formula (II):

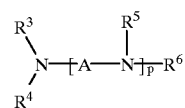

(II)

wherein $R^3$ to $R^6$ are each hydrogen, $C_1$–$C_{30}$-alkyl which optionally contains up to fifteen hydroxyl groups or bc interrupted by up to fourteen non-adjacent oxygen atoms or both, $C_2$–$C_{30}$-alkenyl, $C_7$–$C_{18}$-aralkyl, $C_6$–$C_{14}$-aryl which can be substituted by up to three $C_1$–$C_{12}$-alkyl groups, $C_1$–$C_{12}$-alkoxy groups, halogen atoms, cyano groups, hydroxyl groups or $C_1$–$C_4$-alkoxycarbonyl groups, or are each a group of the formula —$CR^1R^2$—$PO_3H_2$, —$CH_2$—COOH or —$CH_2$—$CH(OH)$—$R^1$, where at least one of the radicals $R^3$ to $R^6$ is the group —$CR^1R^2$—$PO_3H_2$ and at least a further one of these radicals is $C_6$–$C_{30}$-alkyl, $C_6$–$C_{30}$-alkenyl, $C_7$–$C_{18}$-aralkyl, unsubstituted or substituted $C_6$–$C_{14}$-aryl or the group —$CH_2$—$CH(OH)$—$R^9$, where $R^9$ is $C_6$–$C_{30}$-alkyl, $C_6$–$C_{30}$-alkenyl, $C_7$–$C_{18}$-aralkyl or unsubstituted or substituted $C_6$–$C_{14}$-aryl, and where $R^1$ and $R^2$ are hydrogen, $C_1$–$C_{30}$-alkyl which optionally contains up to fifteen hydroxyl groups or is interrupted by up to fourteen non-adjacent oxygen atoms, $C_2$–$C_{30}$-alkenyl, $C_7$–$C_{18}$-aralkyl, $C_6$–$C_{14}$-aryl which is optionally substituted by up to three $C_1$–$C_{12}$-alkyl groups, $C_1$–$C_{12}$-alkoxy groups, halogen atoms, cyano groups, hydroxyl groups or $C_1$–$C_4$alkoxycarbonyl groups;

A is a $C_1$–$C_{12}$-alkylene group which optionally contains as substituenits up to three $C_1$–$C_{30}$-alkyl groups, $C_2$–$C_{30}$-alkenyl groups, $C_7$–$C_{18}$-aralkyl groups or $C_6$–$C_{14}$-aryl groups which can in turn be substituted by up to three $C_1$–$C_{12}$-alkyl groups, $C_1$–$C_{12}$-alkoxy groups, halogen atoms, cyano groups, hydroxyl groups or $C_1$–$C_4$-alkoxycarbonyl groups, where, if a plurality of groups A are present, these can be identical or different; and p is a number from 0 to 30,000, thereby effecting extraction of at least one metal ion from at least one other metal ion, wherein said organic phase optionally includes at least one modifier, with the proviso that alkoxylated alcohol and alkoxylated amine modifiers are excluded.

2. The method of claim 1, wherein, in formula (II), p is zero and $R^6$ is —$CR^1R^2$—$PO_3H_2$ are as defined above.

3. The method of claim 1, wherein the liquid phase containing said compound of formula (II) is an organic solvent containing phase wherein the organic solvent is an aliphatic, cycloaliphatic or aromatic hydrocarbon or mixtures thereof, a halogenated hydrocarbon, a ketone or an ether.

4. The method of claim 3, wherein the concentration of said compound of formula (II) as a monomer or oligomer in said organic solvent ranges from 0.01 to 8 mole/liter.

5. The method of claim 4, wherein the concentration of said compound of formula (II) as a monomer or oligomer in said organic solvent ranges from 0.05 to 3 mole/liter.

6. The method of claim 3, wherein the concentration of said compound of formula (II) as a polymer in said organic solvent ranges from 0.5 to 800 g/liter.

7. The method of claim 6, wherein the concentration of said compound of formula (II) as a monomer or oligomer in said organic solvent ranges from 5 to 600 g/liter.

8. The method of claim 1, wherein the pH of the aqueous medium containing the at least one metal ion ranges from <0 to 7.

9. The method of claim 1, wherein the aqueous solution contains from 0.1 ppm to 80% by weight of metal ion.

10. The method of claim 1, wherein the weight ratios of organic phase to aqueous solution ranges from 1:20 to 20:1.

11. The method of claim 1, wherein said compound of the formula (II) is selected from the (group consisting of polyalkyleniepolyaiminies and polyalkylenie polyamides containing at least one group of the formula —CR$^1$R$^2$—PO$_3$H$_2$ and at least one additional C$_6$–C$_{30}$-alkyl radical, C$_6$–C$_{30}$-alkenyl radical, C$_7$–C$_{18}$-aralkyl radical, optionally substituted C$_6$–C$_{14}$ radical or group of the formula —CH$_2$—CH(OH)—R$^9$.

12. The method of claim 1, wherein the extraction is effected in the presence of at least one modifier.

13. The method of claim 12, wherein the modifier is a straight-chain or branched long-chain alcohol having from 10 to 22 carbon atoms.

14. A method of effecting solvent extraction of one or more metal ions from an aqueous solution, which comprises:
solvent extracting at least one metal ion selected from the group consisting of magnesium, vanadium, chromium, molybdenum, manganese, cobalt, nickel, zinc, cadmium, aluminum, tin, and arsenic from an aqueous solution containing at least one other metal ion selected from the group consisting of magnesium, vanadium, chromium, molybdenum, manganese, iron, cobalt, nickel, copper, zinc, cadmium, aluminum, gallium, tin, arsenic and bismuth with an organic liquid phase containing a metal ion complexing compound having formula (II):

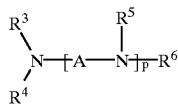

(II)

wherein R$^3$ to R$^6$ are each hydrogen, C$_1$–C$_{30}$-alkyl which optionally contains up to fifteen hydroxyl groups or be interrupted by up to fourteen non-adjacent oxygen atoms or both, C$_2$–C$_{30}$-alkenyl, C$_7$–C$_{18}$-aralkyl, C$_6$–C$_{14}$-aryl which can be substituted by up to three C$_1$–C$_{12}$-alkyl groups, C$_1$–C$_{12}$-alkoxy groups, halogen atoms, cyano groups, hydroxyl groups or C$_1$–C$_4$-alkoxycarbonyl groups, or are each a group of the formula —CR$^1$R$^2$—PO$_3$H$_2$, —CH$_2$—COOH or —CH$_2$—CH(OH)—R$^1$, where at least one of the radicals R$^3$ to R$^6$ is the group —CR$^1$R$^2$—PO$_3$H$_2$ and at least a further one of these radicals is C$_6$–C$_{30}$-alkyl, C$_6$–C$_{30}$-alkenyl, C$_7$–C$_{18}$-aralkyl, unsubstituted or substituted C$_6$–C$_{14}$-aryl or the group —CH$_2$—CH(OH)—R$^9$, where R$^9$ is C$_6$–C$_{30}$-alkyl, C$_6$–C$_{30}$-alkenyl, C$_7$–C$_{18}$-aralkyl or unsubstituted or substituted C$_6$–C$_{14}$-aryl, and where R$^1$ and R$^2$ are hydrogen, C$_1$–C$_{30}$-alkyl which optionally contains up to fifteen hydroxyl groups or is interrupted by up to fourteen non-adjacent oxygen atoms, C$_2$–C$_{30}$-alkenyl, C$_7$–C$_{18}$-aralkyl, C$_6$–C$_{14}$-aryl which is optionally substituted by up to three C$_1$–C$_{12}$-alkyl groups, C$_1$–C$_{12}$-alkoxy groups, halogen atoms, cyano groups, hydroxyl groups or C$_1$–C$_4$-alkoxycarbonyl groups;

A is a C$_1$–C$_{12}$-alkylene group which optionally contains as substituents up to three C$_1$–C$_{30}$-alkyl groups, C$_2$–C$_{30}$-alkenyl groups, C$_7$–C$_{18}$-aralkyl groups or C$_6$–C$_{14}$-aryl groups which can in turn be substituted by up to three C$_1$–C$_{12}$-alkyl groups, C$_1$–C$_{12}$-alkoxy groups, halogen atoms, cyano groups, hydroxyl groups or C$_1$–C$_4$-alkoxycarbonyl groups, where, if a plurality of groups A are present, these can be identical or different; and p is a number from 0 to 30,000, thereby effecting extraction of at least one metal ion from at least one other metal ion, wherein said organic phase optionally includes at least one modifier, with the proviso that alkoxylated alcohol and alkoxylated amine modifiers are excluded; and separating the organic solvent liquid phase containing complexed metal ions from the aqueous phase, thereby enabling recovery of separated metal ions and aminoalkylenephosphonic acid complexing compound.

* * * * *